No. 869,383. PATENTED OCT. 29, 1907.
H. ODERMANN & C. V. STRUB.
AUXILIARY AUTOMATIC LUBRICANT CONTROLLING DEVICE.
APPLICATION FILED APR. 21, 1906.

WITNESSES:

INVENTORS.
BY
ATTORNEYS.

UNITED STATES PATENT OFFICE.

HENRY ODERMANN AND CHARLES V. STRUB, OF MILWAUKEE, WISCONSIN.

AUXILIARY AUTOMATIC LUBRICANT-CONTROLLING DEVICE.

No. 869,383.  Specification of Letters Patent.  Patented Oct. 29, 1907.

Application filed April 21, 1906. Serial No. 312,986.

*To all whom it may concern:*

Be it known that we, HENRY ODERMANN and CHARLES V. STRUB, citizens of the United States, residing at the city of Milwaukee, county of Milwaukee, and State of Wisconsin, have invented new and useful Improvements in Auxiliary Automatic Lubricant-Controlling Devices, of which the following is a specification.

The object of our invention is to provide means for automatically supplying all kinds of journal bearings with oil or other lubricant whenever the ordinary supply of lubricant has become exhausted or when from any other cause the journal or journal box has become heated above its normal temperature whereby the injurious effects arising from heated journal boxes or journals may be avoided.

While our device is adapted to be connected directly with an oil reservoir which is formed integrally with the journal box of a car axle or other similar bearings and a separate oil cup dispensed with we have shown the same connected with the discharge duct of an ordinary oil cup as it is adapted to be used in connection with ordinary journal bearings.

The construction of our invention is explained by reference to the accompanying drawing, in which,—

Figure 1:
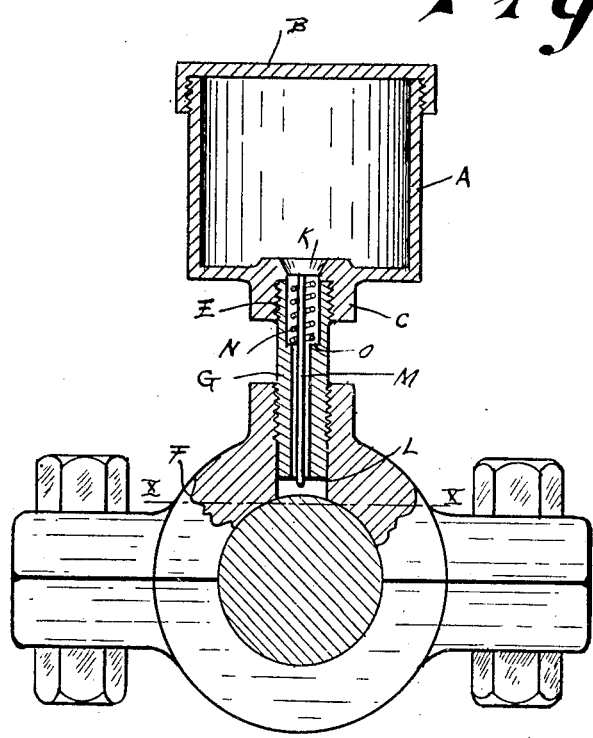
Figure 2:
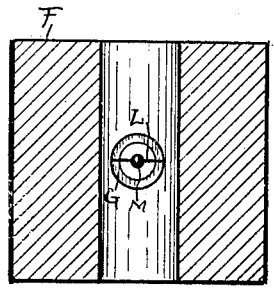

Figure 1 is a vertical section of our automatic lubricating device in which a non-fusible stopper is employed to close the inlet opening of the discharge duct of the reservoir which is held in its closed position against the recoil of a spring by a fusible anchor which anchor is connected with the stopper by a rod whereby when the anchor is fused the stopper will be thrown from its seat and the discharge duct opened. Fig. 2 is a horizontal section drawn on line *x—x* of Fig. 1 showing the anchor for holding the valve in its seat.

Like parts are identified by the same reference letters in both views.

A indicates an oil cup of ordinary construction provided with a cover B.

C is a coupling sleeve formed integrally with the cup. The cup A is connected with the journal box F by an ordinary nipple or sleeve G, said nipple or sleeve having screw threaded bearings at its upper end in said cup and at its lower end in said journal box.

The parts thus far described are substantially of ordinary construction.

While we have thus far shown and described our device used in connection with an oil reservoir which is adapted to be connected with a journal bearing, it is understood that a single reservoir of comparatively large capacity may be located at a distance from and connected with a plurality of journal bearings by a plurality of ducts and that the fusible stopper may be connected at the discharge ends of the several ducts where the same are connected with the journal bearings, whereby when any one or more of the several journal bearings become heated they will be automatically supplied from the same reservoir.

K represents a stopper which is connected with a fusible anchor L by a connecting rod M.

N is a spiral spring which is interposed between the shoulders O and the stopper K. It will be understood that the stopper K is retained in its seat against the recoil of the spring N by the anchor L with which anchor it is connected by the rod N. When, however, the lower end of the sleeve G becomes heated by the journal box the anchor L will be fused and the rod M released when said stopper K will be thrown from its seat by the recoil of the spiral spring N when the contents of the reservoir A will flow through the duct or sleeve G into the journal bearing.

It will be understood that by locating the lubricant controlling valve K at the mouth of the duct D and the anchor L at the lower end of the duct the oil or other lubricant in the reservoir will be prevented from entering said duct and coming in contact with the anchor while said anchor is intact, whereby the cooling effect of the lubricant upon the anchor is prevented and said anchor will be fused much quicker than it would if the lubricant were brought in direct contact therewith, and whereby the danger of the journal box becoming excessively heated before fusing the anchor is avoided.

Having thus described our invention what we claim as new and desire to secure by Letters Patent is,—

1. The combination, with the discharge duct of a lubricant reservoir and a supporting journal box, of a valve adapted to close the upper end of said duct with the downward pressure of the lubricant above it, a valve stem extending from said valve through said duct to the lower end thereof, a valve actuating spring having supporting bearings at one end in the walls of said duct, said spring being adapted to bear at its opposite end against said valve, a fusible attachment connected with the lower end of said valve stem and adapted to coöperate with a lubricant in the reservoir to hold said valve to its seat against the recoil of said spring, said valve being adapted to prevent all access of the lubricant to said fusible attachment until after such attachment is fused, substantially as set forth.

2. The combination of a lubricant reservoir, a journal box, a duct provided with a spring supporting bearing, communicating between said reservoir and said journal box, a valve located in the upper end of said duct adapted to close with the pressure of the lubricant in said reservoir, a valve stem connected at its upper end with said valve and extending to the lower end of said duct, a spiral spring inclosing said valve stem and supported at its lower end in the bearings formed therefor in the walls of said duct and adapted to bear at its upper end against the lower side of said valve, a transversely arranged fusible anchor connected at its center to said valve stem and adapted to bear at its respective ends against the lower end of said duct and to hold said valve in its closed position against the recoil of said spring, all substantially as and for the purpose specified.

In testimony whereof we affix our signatures in the presence of two witnesses.

HENRY ODERMANN.
CHARLES V. STRUB.

Witnesses:
JAS. B. ERWIN,
O. R. ERWIN.